Dec. 30, 1952

R. T. POUNDS 2,623,636

APPARATUS FOR DYNAMICALLY DETERMINING
WEIGHT AND FOR ASSORTING ARTICLES

Filed March 14, 1950

Inventor
Richard T. Pounds

By Johnson and Kline
Attorneys

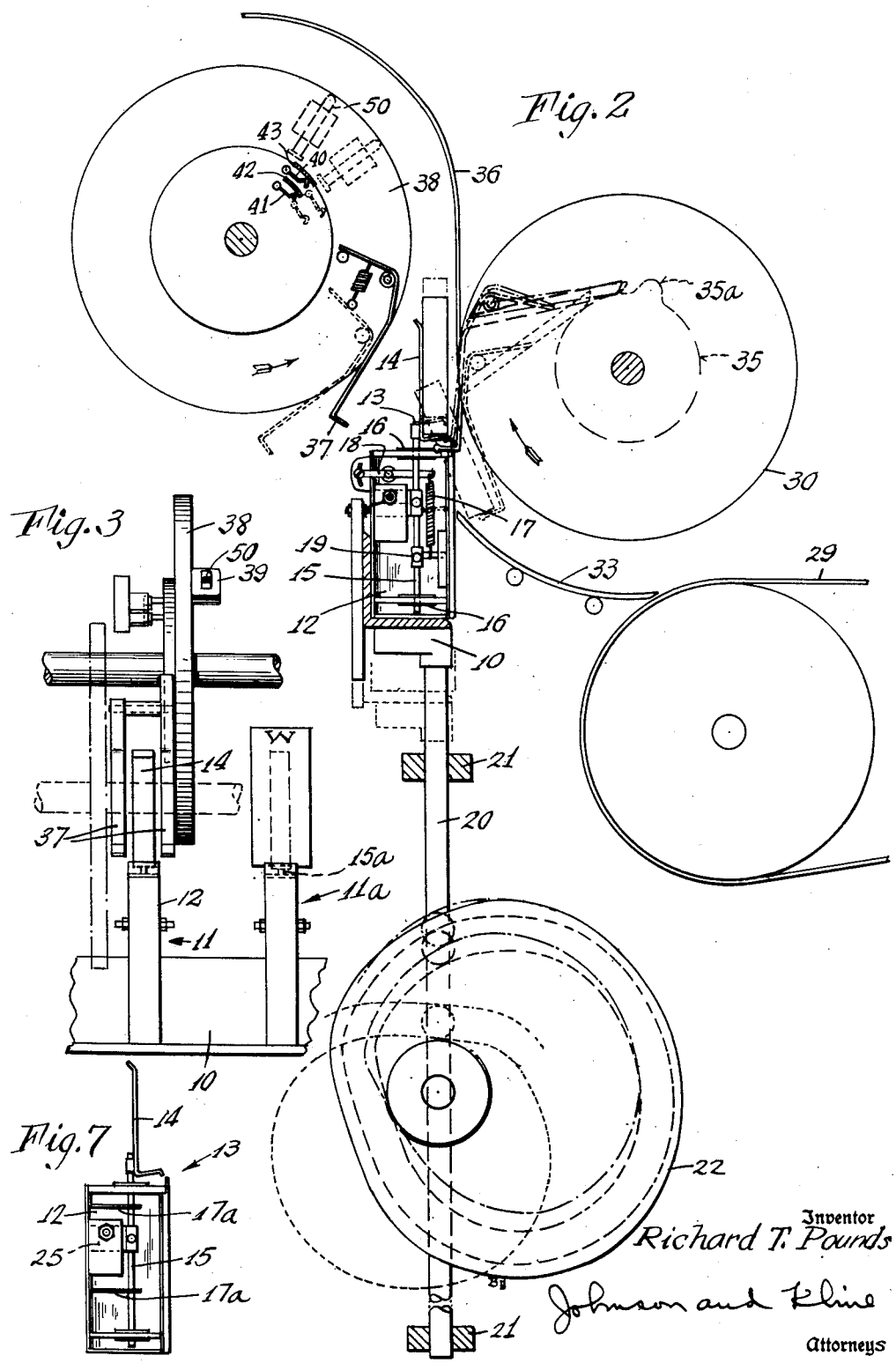

Inventor
Richard T. Pounds
By Johnson and Kline
Attorneys

Inventor
*Richard T. Pounds*

By
*Johnson and Kline*
Attorneys

UNITED STATES PATENT OFFICE 2,623,636

APPARATUS FOR DYNAMICALLY DETERMINING WEIGHT AND FOR ASSORTING ARTICLES

Richard T. Pounds, Westport, Conn.

Application March 14, 1950, Serial No. 149,525

20 Claims. (Cl. 209—121)

The present invention relates to a novel apparatus for dynamically determining weight and for assorting articles which are particularly suited for high speed weighing.

Heretofore the inertia of the elements of the weighing devices and the restoring cycle of such devices have limited the speed at which the weighing could be accomplished.

The present invention overcomes these difficulties by measuring the inertia of the body when subjected to a predetermined force and acceleration, it being a known fact that the inertia of a given mass is always the same and that masses having equal inertias have also equal weights. This is accomplished by positioning the body to be weighed on a support yieldably mounted on a carrier and moving the carrier through a weighing cycle, including a weighing period, with a predetermined acceleration and determining the relative movement of the body with respect to the carrier during a predetermined time in said period.

The acceleration of the carrier during the weighing period may be constant but in the preferred form of the invention it is a progressively increased acceleration at a predetermined rate producing an acceleration pattern which provides for a greater variation in either time or relative movement per unit of weight variation.

In addition to the weighing period, the weighing cycle includes a restoring period in which the movement of the carrier and support thereon is reversed and they are returned to normal starting position in preparation for the next weighing operation.

Since the device of the present invention does not depend upon gravity for its measuring force, it may be operated in any direction of movement as may be required by the particular installation.

The present invention is particularly well suited for high speed detection of correct, overweight or underweight articles and the separation of the same. Further, by proper calibration of the device, the amount of overweight or underweight can be determined and the articles segregated accordingly.

With the present invention, by properly selecting the value of the yieldable spring connecting means, which bears a predetermined relation to the weight of the body, and the acceleration pattern, a period can be provided in which the package will move with the carriage without any relative movement between them. This is of tremendous advantage when weighing packages of loose material such as powder, candy, cereal or the like since it provides an initial period of movement of the package or stabilizing period in which the loose material will be compacted and stabilized prior to the weighing measurement.

The device of the present invention can be used without a comparing means when outside disturbances or conditions will not affect the required accuracy. However, where outside conditions are present which would inject undesired errors in the weighing, they can be nullified by employing a second weighing unit on the carriage having thereon a standard mass and subjecting it to the same conditions as the body to be weighed and comparing the relative movements of the two with respect to the carriage.

The weight of the body can be determined from the relative movement of the support in various ways. For example, it can be determined from the time in the period that relative movement first starts, from a predetermined movement at a predetermined time in the weighing cycle, or from the total movement in a weighing cycle depending upon the particular application in which the weighing device is being used.

The range of the weighing device can be varied by changing the spring means connecting the support to the carrier. However, in the preferred form of the invention, the support and yieldable means are mounted in a housing and form a weighing unit which is detachably mounted on the carrier for movement therewith. With this construction the range of the weighing device can be changed merely by replacing the unit with one in the desired range.

The device of the present invention when incorporating an electric control is extremely well suited for high speed measuring and/or comparing since the amount of movement and the time involved in a weighing measurement are extremely small, being in the nature of thousandths of an inch in travel and in microseconds in time.

If desired, the device may be provided with an indicating and/or recording device for indicating or recording the weights of the packages.

The device of the present invention while herein disclosed as applied to a single weighing unit may be employed with multiple units for simultaneously weighing a plurality of bodies and segregating the bodies in accordance with the weight determination.

Other features and advantages of the invention will be apparent from the specification and claims when considered in connection with the drawings in which:

Fig. 2 is a view similar to Fig. 1 showing the relation of the parts for a single package.

Fig. 3 shows a partial sectional view of the machine showing the comparative standard and weight mounted on the carrier and their relation to the pick-up fingers.

Fig. 7 shows a modified form of weighing unit.

While the present invention may be employed to determine the weight of various bodies, for the purpose of illustrating the invention it is employed for weighing closed packages of loose material and to separate out those below a predetermined minimum.

Figures 1, 4:
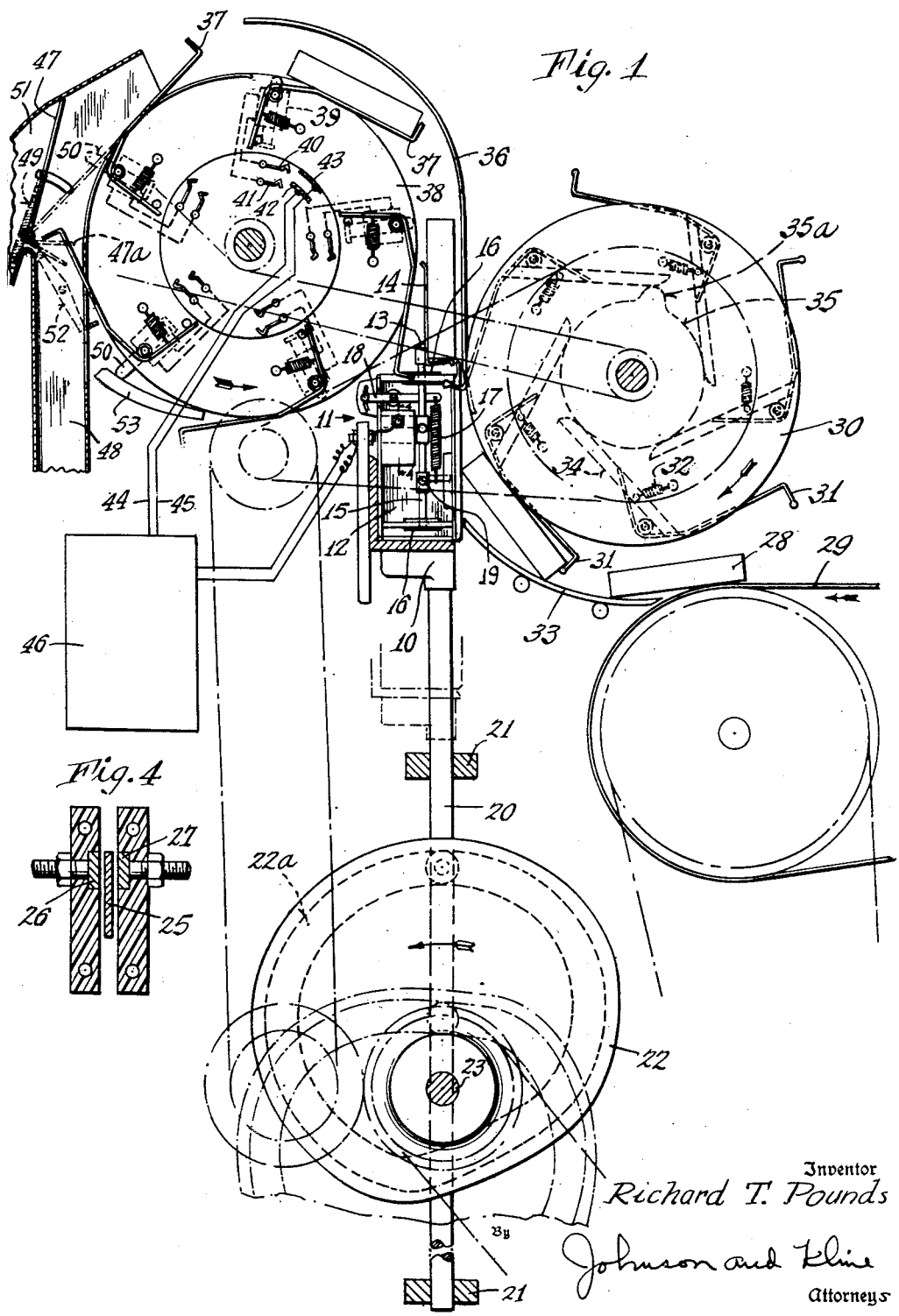
Figure 1 shows a diagramatic illustration of a machine embodying the present invention.
Fig. 4 is a detailed sectional view through the condenser and shield in the weighing unit taken along lines 4—4 of Fig. 1.

As shown in Fig. 1, the invention comprises a carrier 10 having mounted thereon a weighing unit 11. While this weighing unit may be built as an integral part of the carrier, it is at present preferred to make the same as a separate unit, which can be readily removed and replaced to vary the range of the device, and mount it on the carrier for movement therewith.

The weighing unit comprises a housing 12 which is adapted to be detachably secured to the carriage in any suitable manner (not shown). The housing 12 has a package support 13 mounted thereon for free sliding movement with respect thereto and to the carrier to which it is fixed. The package support comprises a package receiver 14 positioned above the housing and secured to the projecting end of a rod 15 freely slidably mounted within the housing by substantially frictionless bearings 16 carried by the housing. A coiled spring 17 is positioned within the housing and has its upper end connected to the housing by an adjustable link 18 and the lower end connected by an adjustable collar and pin 19 to the rod 15, thus providing for adjustments in the tension in the spring. The spring urges the rod 15 and its package receiver 14 to an upper normal position and its tension is selected so that it bears a definite relation to the weight of the package to be weighed, for example it may have a tension equal to 3 g. or three times the pull of gravity on the body.

The carrier is moved through a weighing cycle with a predetermined acceleration pattern. In the illustrated form of the invention, this is accomplished by mounting the carrier on a rod 20 mounted in frame bearings 21. The rod is reciprocated in the line of movement of the supporting rod on the housing by means of a cam 22 mounted on a shaft 23 driven by the common source of power for the machine (not shown). The cam track 22a of cam 22 is so designed that the carrier is moved through a weighing cycle including a weighing period and a restoring cycle with a required acceleration. While the acceleration during the weighing period may be at a uniform value, in the herein illustrated form of the invention I employ an increasing acceleration having a predetermined pattern which, for example, will reach the maximum slightly in excess of the value of 2 g. or two times the pull of gravity on the body.

As the carrier and package mounted thereon are moved through the initial part of the weighing period there will be no relative movement of the package support with respect to the carrier until the point wherein the accelerating force and the pull of gravity on the package overcomes the pull of the spring 17 at which time the rod 15 and package will move relative to the carrier in a manner having a direct relation to the weight of the package. It can be readily determined when the downward movement with respect to the carrier should start for a body of a known weight. If the body is heavier it will start its movement at an earlier point in the travel of the carrier. If it is lighter, it will start at a later movement of the carrier. Thus, by measuring the relative movement of the rod 15 with respect to the carrier at a predetermined time in the movement of the carrier, the weight of the package can be determined.

The initial period, when there is no relative movement between the package and carrier, can be utilized in cases where packages of granular or other loose material are being weighed to enable the particles in the package to be compacted and, in effect, stabilized before the weighing operation takes place so that the weighing will be unaffected by any impacts of the particles which might affect the accuracy of the weighing.

After the weighing period the cam moves through the restoring period in which the movement of the carrier is reversed and it is returned to starting position.

It is believed that the operation of the device might be better understood if a particular example is considered.

In the present design the acceleration is vertical and the forces which cause the relative movement of the package support with respect to the carrier are the resultant forces of gravity and those caused by the inertia of the body. Since the support 13 and the body to be weighed must be considered as one mass, the weight of each must be predetermined and suitable operating relationships set up. If the initial spring tension is adjusted to a value equal to three times the weight of the body plus the weight of the supporting members no deflection can occur until the resultant forces are at least equal to that value. If M is the weight of the body plus the support means it is apparent that the total forces required for deflection would be 3M. Therefore, since gravity is exerting a force of M, a force of 2M must be imparted by the acceleration before deflection can occur.

Figure 10:
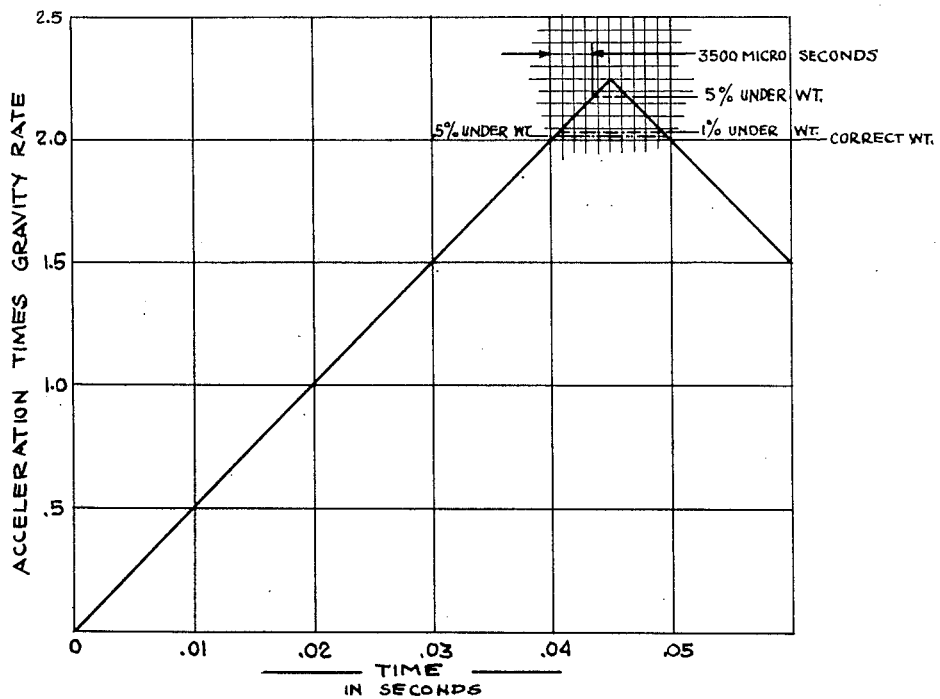
Fig. 10 shows a chart of an acceleration-time curve during a weighing period.

In the preferred form the acceleration pattern would start at some value less than that required to effect deflection and would increase its acceleration rate uniformly in intervals of time. In other words, the initial acceleration could be any value less than that which would result in the 3M force, providing the acceleration is continued to increase until the desired rate was attained and exceeded. An acceleration-time chart during the weighing period is shown in Figure 10.

Since acceleration is a change of velocity and inertia is that property of a mass which resists the change of velocity, it is apparent that the forces which cause deflection are equal to mass times acceleration or MA. During the acceleration period and before deflection occurs the body being weighed moves at the same velocity as the carrier and it continues to move with an acceleration rate equal to that of the carrier. However, when the acceleration rate reaches the point that the total forces acting on the body are equal to the spring tension, the body can no longer accelerate except by the forces transmitted through the spring. During the short interval of time considered the body continues to move at the same velocity it had at the instant deflection began, which occurred at 2 g. acceleration and since the tension of the spring is capable of imparting only 2 g. acceleration while the carrier continues to have its acceleration increased, the carrier acquires a velocity greater than the body. This results in a measurable difference in the relative position of the body and carrier for each instant of time. The carrier cam is designed to begin its deceleration pattern shortly after the desired acceleration point is attained and since the body continues to move at a substantially fixed rate it overtakes the carrier and returns to its normal position thereon.

If the body's weight is somewhat less than the desired weight, deflection cannot occur at 2 g. acceleration since the forces developed are a function of the mass. Assuming the mass to have a value of .9M or 10% less than the desired weight, deflection could not occur until the resultant forces are equal to 3M. For deflection:

$$(MA) + Mg = 3M$$

$$Mg = .9M$$

$$3M - .9M = 2.1M \text{ required additional force}$$

Since only .9M is on the support the acceleration must be $$\frac{2.1}{.9} = 2.33 \text{ g.}$$

or an increase in acceleration by a .33 g. for each 10% decrease in weight. 1% decrease in weight would require .033 change in acceleration.

The differences are shown on the chart of Fig. 10 and from this it will be seen that there is a predetermined relationship between the weight of the body being weighed and its movement and the time of the movement in the cycle.

While the relative movement of the rod on the body may be measured in any suitable way as by wiping contacts or other similar means, in the preferred form of the invention it is accomplished by providing a vane or shield 25 secured to the rod 15 and positioned to move between a pair of spaced plates 26, 27 of a condenser carried by the housing, as shown in Fig. 4, to vary the capacitance thereof in accordance with the position of rod 15 and control the weight determining circuit as will be explained hereinafter.

Where a high degree of accuracy unaffected by outside variations is required, it is preferred to employ a comparing means which consists of a second weighing unit 11a mounted on the carrier as shown in Fig. 3 and having a standard known comparing weight W secured to the rod 15a. The structure of the weighing unit is identical with that above described. As cam 22 drives the carrier through the weighing cycle the rod 15a on the comparing unit will move through a predetermined distance. This motion is then compared with that of the rod 15 in the weighing unit for the package to determine the weight of the package.

The weighing device of the present invention is particularly well suited for high speed weighing of articles. The articles may be fed to and removed from the weighing device in any suitable manner. In the herein illustrated form of the invention the closed packages 28 are fed from a supply, not shown, to the weighing device by a belt 29. A pick-up wheel 30 is rotatably mounted adjacent the end of the belt and is provided with a plurality of resilient fingers 31 pivotally mounted on the face of the wheel and normally urged by springs 32 so that their ends project beyond the periphery of the wheel to engage behind the packages and move them one at a time over a guide plate 33 into position on the package receiver 14 on the carrier. Each pick-up finger has an extension 34 which rides on a fixed cam 35 and engages a projection 35a thereon to withdraw the finger at a fixed time to clear the package which has been located on the package receiver. The wheel 30 and the cam 22 are rotated in a predetermined timed relation, the cam shaft 23 making one revolution for each finger on the feed wheel.

Further the cam slot 22a is so designed that the carrier will move, at the point of transfer of the package from the fingers to the package support, at a velocity equal to the velocity of the package as produced by the pick-up wheel.

In the application of the weighing unit herein illustrated, the package will be moved upward vertically during a weighing period. After the weighing period has been completed and the carriage reversed the package will continue to move upwardly and under the momentum supplied by the carriage and will be guided by a guide plate 36 to a position where it will be picked up by spring-pressed fingers 37 on a take-off wheel 38 and carried to a separating point. The take-off wheel 38 is driven in timed relation to the pick-up wheel so that the movement of fingers on two wheels is coordinated to insure movement of the packages through the device without jamming. Any suitable separating means may be employed for segregating the packages. In the means herein illustrated each of the fingers 37 on the take-off wheel is provided with a solenoid 39 located in advance thereof as shown in Fig. 2 and having wiping contacts 40, 41 to engage the fixed contacts 42, 43 connected by wires 44, 45 to the controlling unit 46 which is connected to the condenser plates 26, 27 on the weighing unit so as to be energized in accordance with the weight determination of the package to be engaged by its related finger 37.

A deflector gate 47 is normally positioned as shown in full lines in Fig. 1 to direct the packages of less than minimum weight into the chute 48. The gate is held in this position by toggle spring 49. When the weight of a package is over the predetermined minimum weight, the solenoid will be energized. When energized, the solenoid will project a normally retracted pin 50 which will engage the tail 47a of the gate in advance of the package and move the gate to the dot and dash position wherein the package will be directed into chute 51. The pin 50 will then engage the pivoted lever 52 to return the gate to its normal position. Thereafter the pin engages a resetting plate 53 which returns the pin to retracted position.

Figure 5:
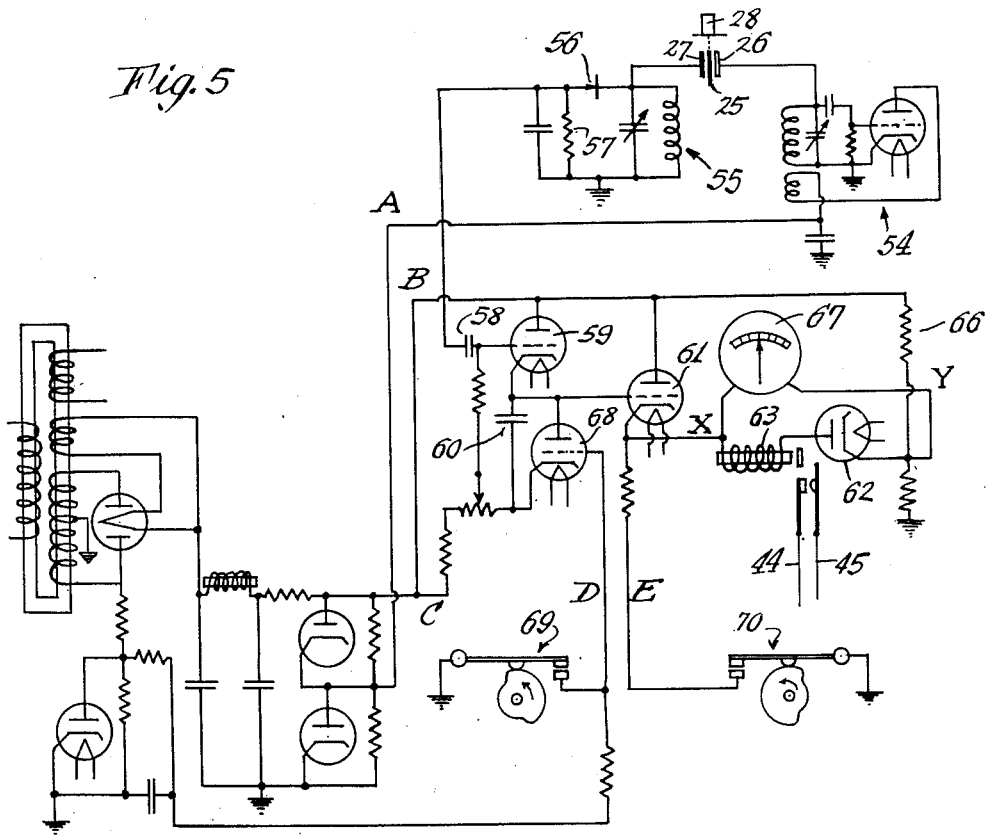
Fig. 5 is a view of the weighing and control circuit showing the power source and control cams for the installation wherein no comparative weight is used.
Figure 6:
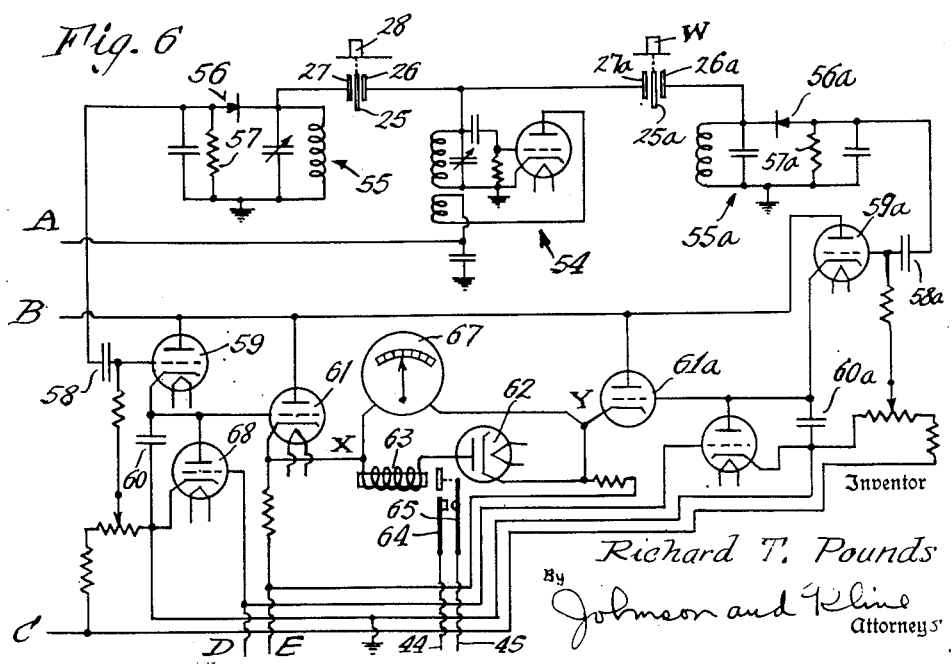
Fig. 6 shows the circuit which is adapted to be connected to the power circuit and discharge circuit of Fig. 5 at the points A, B, C, D and E and shows the duplicate circuit for the comparing unit and weighing unit.

Various systems may be employed to translate the movement of the rod taken at a predetermined time in the weighing cycle into a weight measurement which might be used in separating the packages according to said determination. In the preferred form of the invention this is accomplished electronically since it can be operated instantaneously in response to minute movements of the package and thus obtain a higher speed in the weight determination. The circuits which may be employed in the controlling unit are shown in Figs. 5 and 6, Fig. 5 showing the circuit where no comparing unit is employed while Fig. 6 shows the circuit when a comparing unit is provided. Since the illustrated form of the invention employs a comparing unit, the latter circuit will now be considered. It will be seen that it includes a radio frequency oscillator 54 for generating a voltage of the desired magnitude usually in the order of 100 volts. This oscillator voltage is applied to plates 26, 26a of each of the two condensers formed by the plates carried by the housing. The other plates 27, 27a of the condensers are connected in the circuit and the shields 25, 25a carried by the rod 15, 15a are disposed between the plates and control the coupling between the plates. When the shield is in its normal static position the coupling between the plates is reduced to a very little value. However, when the shield moves from its normal position a variable degree of coupling between the plates is obtained, the value of which is equal to the amount of deflection which in turn is an indication of the weight of the body causing the deflection. The voltage from the oscillator is applied through this varying coupling condenser to a resonant circuit 55 whose components are chosen to resonate at the oscillator frequency so that a change in the coupling in the condenser results in a proportionate change in the voltage across the resonant circuit. The voltage across the resonant circuit is applied to the anode of a diode rectifier 56, the cathode return of which includes a load resistor 57. When a voltage is developed across the resonant circuit, the diode conducts during the positive half of each cycle of oscillation and develops a D. C. voltage across the diode load resistance. Since the D. C. voltage is of a variable magnitude, the instantaneous values of which are proportional to the weight of a body being weighed, it may be applied to the grid of a measuring and comparing circuit.

In order to remove the static components of the voltage it is applied to the grid through a coupling condenser 58 and because of the D. C. blocking effect of the condenser, only the variable components caused by the change in coupling due to the weighing operation are conducted.

A tube 59 has its anode connected directly to the positive voltage while its cathode return is through condenser 60 to the ground. Since the condenser cannot continuously conduct direct current, the cathode circuit does not provide a complete D. C. circuit for the tube 59 in the general sense. It will be understood, however, that a condenser will act as a conductor during the time of its charging. Therefore, current can flow through the cathode circuit until its terminal voltage reaches a value at which the cathode of the tube is positive with respect to its grid in an amount equal to the cut-off value of the tube employed. When a general purpose triode, such as a 6J5, is used with an anode potential of 250 volts the condenser charge will be approximately 20 volts. If an additional positive voltage is then applied between the grid and ground, the condenser will continue to charge until the cut-off is again reached. However, when the additional voltage source is removed, the condenser cannot discharge and will remain charged at the new potential since the cathode circuit remains at a higher positive potential with respect to the grid and the cut-off voltage to the tube. Therefore, when a pulse of higher potential from the controlling condenser on the weighing unit is applied to the grid of the tube 59 the cathode condenser will acquire an additional charge equal to the peak value of the positive pulse. Also connected to the high potential terminal of the condenser is the grid of tube 61 which is connected in the usual cathode follower circuit. The voltage across the cathode load resistor of the tube used in this manner varies with the grid voltage and since the grid is connected to condenser 60 the cathode voltage of tube 61 which is connected thereto is a measure of the pulse originating at the condenser in the weighing device. This voltage which appears at X is compared with or is balanced against a predetermined voltage at Y and the result utilized, in the illustrated form of the invention, to control the energization of the solenoids 39 when the weight exceeds the predetermined minimum. Since the illustrated form of the invention employs a comparing means having a known standard comparing weight, the voltage at Y is produced as a result of the relative movement of the vane 25a between plates 26a and 27a as a result of the acceleration of the known standard.

As is shown in Fig. 6, the above-described circuit for producing the voltage in response to movement of the package being weighed is reproduced to produce the predetermined voltage against which a comparison is made. It includes, in addition to the condenser plates 26a, 27a, a resonant circuit 55a, a rectifier 56a, a load resistor 57a, a coupling condenser 58a, a tube 59a, condenser 60a and tube 61a which in a manner set forth above will produce a voltage at the point Y which is a measure of the pulse produced by the known standard. The points X and Y are connected through a unidirectional conductor, such as a vacuum tube rectifier 62, and includes in the circuit a relay 63 so that when the voltage at point X exceeds that at point Y the relay will be energized and will move contacts 64, 65 to closed-circuit position and close the circuit through wires 44, 45 to the solenoid 39. If the voltage at point X is less than that at point Y the relay will remain inoperative and the circuit to the solenoids will remain open.

In the case where the comparing weight is not employed, as shown in Fig. 5, the predetermined voltage at point Y is obtained by means of a drop resistor 66 connected to the power source. The relationship between the potentials at points X and Y as above noted will cause the current to flow through the tube 62 and relay 63 in the manner above indicated to control the solenoid 39 directly or through any suitable memory device.

If desired, the points X and Y can also be bridged by a suitable meter and/or recorder 67 which may be an oscilloscope or volt meter calibrated in weight to be actuated by the difference in potential at the points X and Y to give a recording and/or indication of the weight of the package being weighed.

After the weighing cycle it is necessary to discharge condenser 60 before another weight measurement can be made. This is accomplished by means of a tube 68 having its anode connected to the positive terminal of the condenser while its cathode return is to the negative or ground potential side. In order to prevent leakage of the condenser charge through the tube 68 during the weighing cycle, the grid of the tube is maintained at a high negative voltage maintaining a nonconductive state between the anode and cathode. Upon completion of a weighing cycle, a cam-operated switch 69, which is driven in timed relation to the rotation of the cam 22, causes the negative supply to be temporarily shunted, thus removing the bias from the control grid so that the anode of the tube 68 becomes conductive and the condenser is rapidly discharged to zero. After the switch opens, the condenser again acquires its static charge and is ready for a new measuring operation.

As shown in Fig. 5 a second cam-operated switch 70 is employed to insure that the tube 61 remains nonconductive until after a weighing cycle is completed. This prevents the relay 63 from closing until after the weight-determining circuit has completed its operation.

Figure 8:
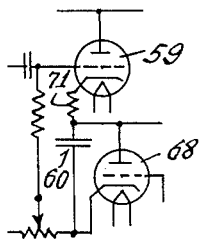
Fig. 8 shows a modification of the control circuit.

When it is desirable to make measurements on the basis of time, a circuit may be employed similar to that shown in Figs. 5 or 6, it only being necessary to alter the cathode circuit of tube 59 by inserting a resistor 71 between the cathode and the condenser 60 as shown in Fig. 8. With this resistance in the circuit, the voltage rise across the condenser 60 is proportional to time. Since the time at which the package support begins to deflect is variable when successive packages of different weights are applied to the package receiver, the duration of deflection may be predetermined by proper cam design, and the total time of deflection will be proportional to the weight of the package, within the predetermined limits.

Since the total range of time measurements is known, the combination of resistance and capacity may be selected for a predetermined charging rate, and the final charge on the condenser will be proportional to the time of deflection.

When such a circuit is employed, the voltage at the cathode junction of the series resistor will rise in direct ratio to the instantaneous signal voltage on the grid of tube 59. Since the charging rate of the condenser is fixed, the actual charge remaining at the end of a weighing cycle will be influenced by both the magnitude and duration of the signal voltage. Due to the fact that the acceleration pattern of the device results in a weighing signal wave form of variable magnitude, as well as variable time, the variation of the final charge on condenser 60 may be made to vary over an extremely wide range, with a relatively small change in the weight of a body. This is true since the charging voltage is that appearing at the cathode of tube 59.

Figure 9:
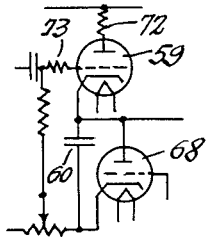
Fig. 9 shows another modification of the control circuit.

If it should be preferable that the variation of charge on the condenser 60 should be independent of the magnitude of the signal voltage, the circuits of Figs. 5 and 6 can be modified with respect to tube 59 by including resistor 72 in the anode circuit as shown in Fig. 9. When placed in that position, the charging voltage is equal to the anode supply and the effective series resistance is the combination of resistor 72 plus the resistance of the tube, the latter being quite small by comparison.

Operation of the circuit under these conditions is somewhat different. Before a weighing pulse is applied, the current flow in tube 61 is zero, since the condenser charge is equal to the current cut-off point of the tube. Since no current flows through resistor 72 there is no voltage drop across it, and the voltage applied to the anode is equal to the supply voltage. However, when a weighing pulse is applied to the grid, current begins to flow through the resistor. Since this results in a lowered instantaneous voltage on the anode, only a small signal is required at the grid to reduce the vacuum tube resistance to near zero, as the grid voltage will be positive with respect to the cathode.

During the interval of time the grid remains positive, the condenser 60 will charge at a rate determined by its value of capacity, and the value of resistor 72. The charging voltage is the anode supply source, and therefore the final charge is proportional to that fixed voltage, being variable only with time. This circuit results in a charge on condenser 60 which is relatively independent of the magnitude of the signal voltage.

When the resistor 72 is placed in the anode circuit, an additional resistor 73 must be placed in series with the grid to limit grid current, since the grid is positive with respect to the cathode and grid current will flow. Unless the series grid resistor is provided, the grid coupling condenser would acquire a charge equal to potential of the signal voltage in a very short interval of time. The series resistor in the grid circuit limits the rate of charge on the coupling condenser, and prevents errors from that source. Although the coupling condenser will acquire some charge, it is quite small in comparison with the signal voltage. When the proper constants are chosen for the value of the grid resistor and the coupling condenser, the acquired charge will be lost during the interval between weighing cycles, and will not influence the accuracy of the succeeding measurement.

While the herein disclosed device of the present invention may be used in connection with a single weight determining unit for weighing a succession of bodies, it is to be understood that a plurality of such units can be mounted side by side on the carrier to simultaneously weigh a plurality of bodies and the plurality of weighing units may be used with a single standard comparing weight.

By connecting the weighing units to suitably known memory devices the weight determination of the device may be used to separate overweight and underweight packages and to segregate them according to the amount of overweight or underweight by proper adjustment of the memory systems.

Since the present method of weighing does not depend upon the force of gravity, the measuring unit may be positioned in any suitable position to move in any direction as required by the particular installation.

Furthermore, by the present method and apparatus, the amount of movement of the body during the measuring operation and the time of its movement can be varied as required. However, since the present method operates very successfully on extremely small relative movements of the body to be weighed, in the nature of thousandths of an inch, during the weighing operation and on short intervals of time, in the nature of microseconds, the present invention becomes extremely suitable for high speed weighing.

Another form of weighing unit is shown in Fig. 7 wherein housing 12 has the package support 13 mounted thereon for relative movement with respect thereto by means of a pair of parallel flat springs 17a which are identical in tension having a predetermined relation to the weight of the package as was the coil spring 17. Each spring has one end mounted on the housing and the other end secured to the rod 15 and urges the rod to a predetermined position on the housing. The rod has the shield 25 and the housing has a cooperating condenser thereon similar to that shown in Fig. 1. The relative movements of rod 15 are slight so that the lateral movement due to the flexing of the springs is negligible. In some installations the initial tension in springs 17a may be supplemented by a coil spring such as 17 in Fig. 1.

Variations and modifications may be made within the scope of the claims and portions of the improvements may be used without others.

I claim:

1. A weight determining device comprising a carrier; a support adapted to receive the body to be weighed mounted on the carrier for relative movement with respect thereto; spring means of predetermined value connected to the support and carrier and urging the support to a predetermined position on the carrier; driving means connected to the carrier to move the carrier with a predetermined acceleration in the direction of the line of movement of the support; and means determining the amount of relative movement between the support and carrier in a predetermined time interval.

2. A weight determining device comprising a carrier; a support adapted to receive the body to be weighed mounted on the carrier by substantially frictionless means for relative movement with respect thereto; spring means of predetermined value with regard to the body to be weighed connected to the support and carrier and urging the support to a predetermined position on the carrier; driving means connected to the carrier to move the carrier through a weighing cycle having a predetermined acceleration in the direction of the line of movement of the support during a weighing period; and means determining the amount of relative movement between the support and carrier in a predetermined time interval during said weighing period.

3. A weight determining device comprising a carrier; a support adapted to receive the body to be weighed mounted on the carrier for relative movement with respect thereto; spring means of predetermined value connected to the support and carrier and urging the support to a predetermined position on the carrier; driving means connected to the carrier to move the carrier through a weighing cycle having a predetermined acceleration in the direction of the line of movement of the support during a weighing period; and electronic means including control means carried by said support determining the amount of relative movement between the support and carrier in a predetermined time interval during the weighing period.

4. A dynamic weighing unit comprising a housing adapted to be mounted on a movable carrier for movement therewith; a support for the body to be weighed mounted on the housing for movement with respect thereto; a pair of parallel spring means mounting said support on said housing and urging the support to a normal position on the housing and having a tension therein bearing a predetermined relation to the pull of gravity on the body to be weighed, said spring means being yieldable and said support moving relative to the housing when the housing is accelerated with a force exceeding the tension of the spring and the weight of the body on the support; and means, including means fixed relatively to the housing and means carried by the support and cooperating with the fixed means, for determining the relative movement of the support with respect to the housing in response to said acceleration.

5. A dynamic weighing unit comprising a housing adapted to be fixedly mounted on a movable carrier; a support for the body to be weighed including a member mounted on the housing for reciprocating movement with respect thereto; a pair of parallel spring means mounting said support on said housing, said spring means acting in the direction of movement of the member and urging the support to a normal position on the housing having a tension therein bearing a predetermined relation to the pull of gravity on the body to be weighed and being yieldable, and said support moving relative to the housing when the housing is accelerated with a force exceeding the tension of the spring and weight of the body on the support; and means, including means fixed relatively to the housing and means carried by the member of the support and cooperating with the fixed means, for determining the relative movement of the support with respect to the housing in response to said acceleration.

6. A weight determining device comprising a carrier; a housing; means securing the housing on the carrier for movement therewith; a support for the body to be weighed mounted on the housing for movement with respect thereto; spring means connecting said support and housing and urging the support to a normal position on the housing and having a tension therein bearing a predetermined relation to the pull of gravity on the body to be weighed; driving means connected to the carrier to move the carrier with a predetermined acceleration in the direction of the line of movement of the support, said spring means yielding and said support moving relative to the housing when the housing is accelerated with a force exceeding the tension of the spring and weight of the body on the support; and means, including means fixed relatively to the housing and means carried by the support and cooperating with the fixed means, for determining the amount of relative movement between the support and carrier in response to said acceleration in a predetermined time interval.

7. A weight determining device comprising a carrier; a housing; means detachably securing the housing on the carrier; a support for the body to be weighed mounted on the housing by substantially frictionless bearing means for reciprocating movement with respect thereto; a spring connecting said support and housing and urging the support to a normal position on the housing, said spring acting in the direction of movement of the support and having a tension therein bearing a predetermined relation to the pull of gravity on the body to be weighed; driving means connected to the carrier to reciprocate the carrier with a predetermined acceleration in the direction of the line of movement of the support, said spring yielding and said support moving relative to the housing when the housing is accelerated with a force exceeding the tension of the spring and weight of the body on the support; and means, including means fixed relatively to the housing and means carried by the support and cooperating with the fixed means, for determining the amount of relative movement between the support and carrier in response to said acceleration in a predetermined time interval.

8. A weight determining device comprising a carrier; a support adapted to receive the body to be weighed mounted on the carrier for relative movement with respect thereto; means for successively positioning bodies to be weighed on the support; spring means of predetermined value connected to the support and carrier and urging the support to a predetermined position on the carrier; driving means connected to the carrier to move the carrier during a weighing period with a predetermined acceleration in the direction of the line of movement of the support; movement determining means determining the amount of relative movement between the body-loaded support and carrier in a predetermined time interval; means removing the bodies after the weighing period; and means responsive to the movement determining means and acting on the last-named means for separating the removed bodies in accordance with the relative movement of said support.

9. A weight determining device comprising a carrier; a support adapted to receive the body to be weighed mounted on the carrier for relative movement with respect thereto; means for successively positioning bodies to be weighed on the support; spring means of predetermined value connected to the support and carrier and urging the support to a predetermined position on the carrier; driving means connected to the carrier to move the carrier during a weighing period with a predetermined acceleration in the direction of the line of movement of the support; control means including means mounted on the support for movement therewith for determining the amount of relative movement between the body-loaded support and carrier in a predetermined time interval; means removing the bodies after the weighing period; and means actuated by said control means for separating the removed bodies in accordance with the relative movement of said support.

10. A weight determining device comprising a carrier; a support adapted to receive the body to be weighed mounted on the carrier for relative movement with respect thereto; means for successively positioning bodies to be weighed on the support; spring means of predetermined value connected to the support and carrier and urging the support to a predetermined position on the carrier; driving means connected to the carrier to move the carrier through a weighing cycle for each body, said cycle including a weighing period wherein the carrier moves with a predetermined acceleration in the direction of the line of movement of the support and a restoring period wherein the support returns to said predetermined position on the carrier; movement determining means determining the amount of relative movement between the body-loaded support and carrier in a predetermined time interval; means removing the bodies from the support after the operation of the last-named means; and means controlled by the movement determining means for separating the removed bodies in accordance with the relative movement of said support with respect to the carrier.

11. A weight determining device comprising a carrier; a support adapted to receive the body to be weighed mounted on the carrier for relative movement with respect thereto; a second support adapted to hold a comparative standard mounted on the carrier for relative movement with respect thereto; spring means of predetermined value connected to the supports and carrier and urging the supports to a predetermined position on the carrier; driving means connected to the carrier to move the carrier with a predetermined acceleration in the direction of the line of movement of the supports; means determining the amount of relative movement between the supports and carrier in a predetermined time interval; and means responsive to a comparison between the two movements for determining the weight of the body.

12. A weight determining device comprising a carrier; a support adapted to receive the body to be weighed mounted on the carrier for relative movement with respect thereto; a second support adapted to hold a comparative standard similarly mounted on the carrier for relative movement with respect thereto; spring means of predetermined value with regard to the body being weighed connected to the supports and carrier and urging the supports to a predetermined position on the carrier; driving means connected to the carrier to move the carrier through a weighing cycle having a predetermined acceleration in the direction of the line of movement of the supports during a weighing period; means including control means carried by each support determining the amount of relative movement between the supports and carrier in a predetermined time interval; and comparing means actuated by said last-named means for comparing the two movements and determining the weight of the body.

13. A weight determining device comprising a carrier; a first support adapted to receive the body to be weighed mounted on the carrier for relative movement with respect thereto; a second support adapted to hold a comparative standard mounted on the carrier for relative movement with respect thereto; means for successively positioning bodies on the first support; spring means of predetermined value connected to the supports and carrier and urging the supports to a predetermined position on the carrier; driving means connected to the carrier to move the carrier during a weighing operation with a predetermined acceleration in the direction of the line of movement of the supports; means determining the amount of relative movement between the supports and carrier in a predetermnied time interval; means removing the bodies from the first support after the weighing operation; and means responsive to a comparison between the two movements and acting on the last-named means to separate the bodies in accordance with said comparison.

14. A weight determining device comprising a carrier; a support adapted to receive the body to be weighed mounted on the carrier by substantially frictionless means for relative movement with respect thereto; spring means of predetermined value with regard to the body to be weighed connected to the support and carrier and urging the support to a predetermined position on the carrier; driving means connected to the carrier to move the carrier through a weighing cycle having a predetermined acceleration in the direction of the line of movement of the support during a weighing period; and means connected to the support, including means detecting the relative movement of the support with respect to said carrier and for timing the duration of said movement, for determining the weight of the body.

15. A weight determining device comprising a carrier; a support adapted to receive the body to be weighed mounted on the carrier by substantially frictionless means for relative movement with respect thereto; spring means of predetermined value with regard to the body to be weighed connected to the support and carrier and urging the support to a predetermined position on the carrier; driving means connected to the carrier to move the carrier through a weighing cycle having a predetermined acceleration in the direction of the line of movement of the support during a weighing period; and means, including means controlled by the relative movement of the body with respect to the carrier, for recording the weight of the body.

16. An apparatus for dynamically determining the weight of a body comprising means positioning the body on a carrier for movement with relation thereto; means moving the carrier with a predetermined acceleration during a weighing period; means measuring the movement of the body with respect to said carrier during a predetermined interval of said period; and means indicating and recording the weight of said body in response to said measurement.

17. An apparatus for dynamically determining the weight of a body comprising means positioning the body on a carrier for movement with relation thereto; means similarly positioning a standard weight on the carrier for movement with relation thereto; means moving the carrier with a predetermined acceleration during a weighing period; means measuring the movement of the body and standard with respect to said carrier during a predetermined interval of said period; and means comparing the relative movement of the body with the relative movement of the standard to determine the weight of the body.

18. An apparatus for dynamically determining the weight of a body comprising means positioning the body on a carrier for movement with relation thereto; means moving the carrier with a predetermined acceleration during a weighing cycle; and means measuring the movement of the body with respect to said carrier during a predetermined interval of said cycle.

19. An apparatus for dynamically determining the weight of a body comprising means positioning the body on a carrier for movement with relation thereto; means moving the carrier with a progressively increasing acceleration during a weighing cycle; and means measuring the time of movement of the body with respect to said carrier during said cycle.

20. An apparatus for separating a plurality of bodies in accordance with the weight thereof comprising means moving a succession of bodies to a weighing station; means positioning the bodies one at a time on a carrier; means supporting the body thereon for relative movement with respect to the carrier; means moving the carrier through a weighing cycle with a predetermined acceleration; means measuring the movement of the body with respect to said carrier during a predetermined interval of said cycle; means removing the body from the weighing station after said measurement; and means separating the removed bodies in accordance with said measurement.

RICHARD T. POUNDS.

REFERENCES CITED

The following references are of record in the file of this patent:

UNITED STATES PATENTS

| Number | Name | Date |
| --- | --- | --- |
| 993,005 | Weck | May 23, 1911 |
| 2,210,970 | Bonell | Aug. 13, 1926 |
| 2,305,783 | Heymann et al. | Dec. 22, 1942 |

FOREIGN PATENTS

| Number | Country | Date |
| --- | --- | --- |
| 251,894 | Great Britain | May 13, 1926 |
| 488,921 | Great Britain | July 15, 1938 |